N. W. AKIMOFF.
DYNAMIC BALANCING MACHINE.
APPLICATION FILED NOV. 4, 1915. RENEWED JULY 6, 1918.
1,296,606.
Patented Mar. 11, 1919.
2 SHEETS—SHEET 1.
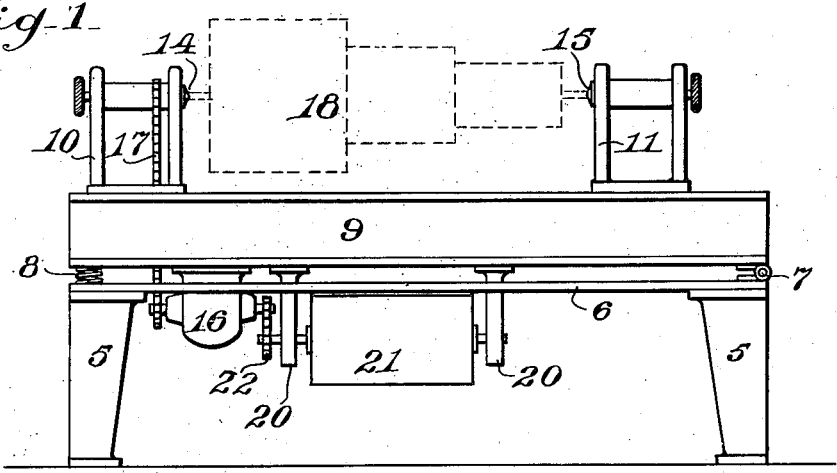
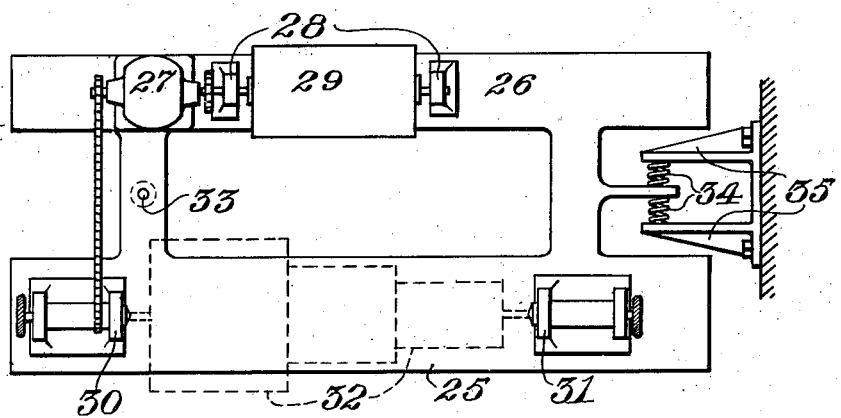
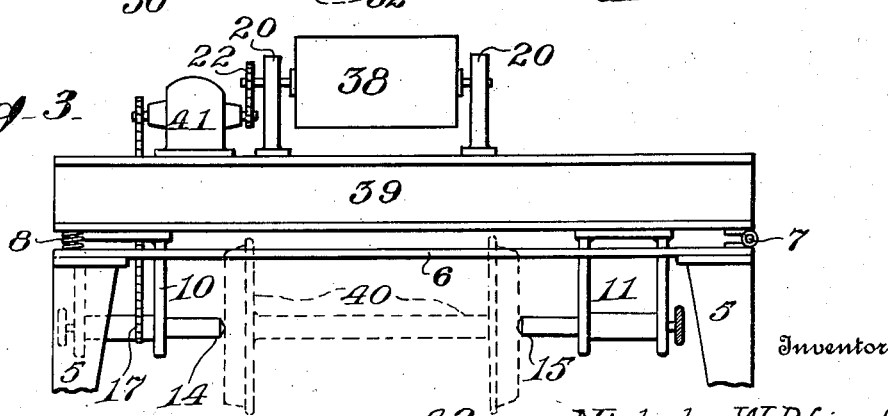

N. W. AKIMOFF.
DYNAMIC BALANCING MACHINE.
APPLICATION FILED NOV. 4, 1915. RENEWED JULY 6, 1918.
1,296,606.
Patented Mar. 11, 1919.
2 SHEETS—SHEET 2.
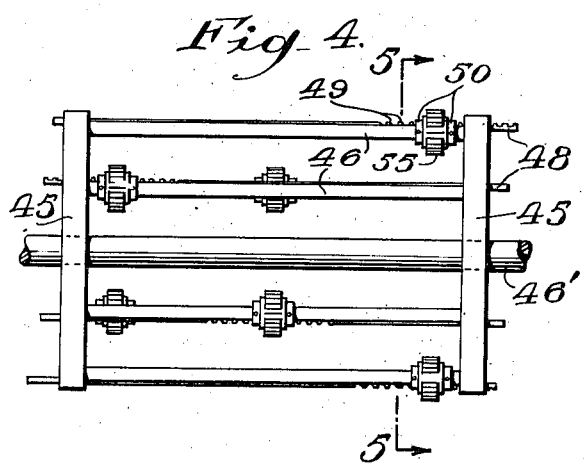
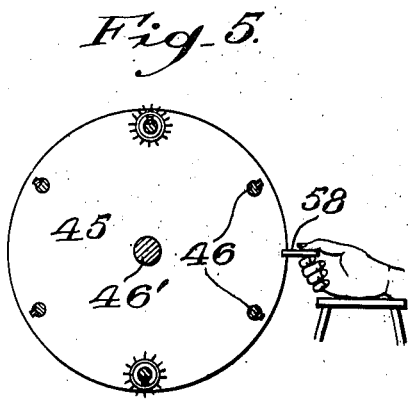
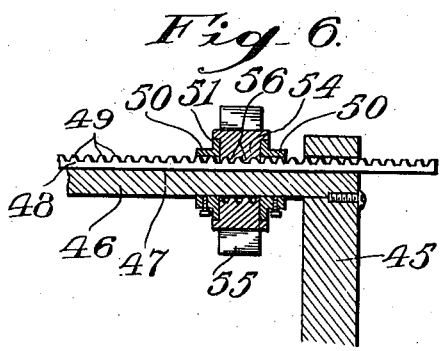
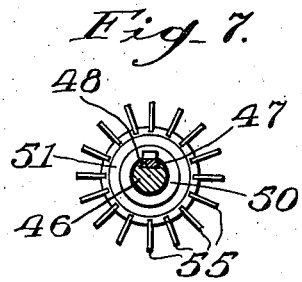
Witness
Thos. Freeman
A. B. Jones.
Inventor
Nicholas W. Akimoff,
By J. Stuart Freeman,
Attorney

UNITED STATES PATENT OFFICE.

NICHOLAS W. AKIMOFF, OF PHILADELPHIA, PENNSYLVANIA, ASSIGNOR, BY MESNE ASSIGNMENTS, TO DYNAMIC BALANCING MACHINE COMPANY, OF PHILADELPHIA, PENNSYLVANIA.

DYNAMIC BALANCING-MACHINE.

1,296,606.  Specification of Letters Patent.  Patented Mar. 11, 1919.

Application filed November 4, 1915, Serial No. 59,659. Renewed July 6, 1918. Serial No. 243,698.

*To all whom it may concern:*

Be it known that I, NICHOLAS W. AKIMOFF, a subject of the Czar of Russia, and a resident of the city of Philadelphia, county of Philadelphia, State of Pennsylvania, United States of America, have invented certain new and useful Improvements in Dynamic Balancing-Machines, of which the following is a full, clear, and exact description.

The object of the invention is to provide an improved dynamic balancing apparatus in which are incorporated the principles covered by applications for Letters Patent of the United States, Serial No. 32,296, for the method of and apparatus for obtaining dynamic balance, and Serial No. 36,573, for the method of and apparatus for detecting dynamic balance, together with certain other novel features not disclosed therein.

In the former of these applications, the improved apparatus described comprises a dynamically balanced body revolubly upon an axis which is coincident with the axis of revolution of an unbalanced body, and operative to be adjusted to an unbalanced condition, to neutralize the unbalanced condition of said latter body, and thereby to create a condition of balance of the system comprising the two bodies. The latter of the said applications describes a principle for detecting the existence of a balanced condition by mounting such apparatus as the above upon resilient members of known frequency of vibration when under load, and then noting whether, and to what extent, said apparatus vibrates.

In the present construction, the object is to revolve the balanced body of the first application upon an axis preferably parallel, but out of coincidence with, and removed from, the axis of revolution of the body being tested, but directly connected in such manner that the two bodies revolve in absolute synchronism, the entire structure being mounted upon yielding members, such as helical springs, having predetermined periods of natural vibration.

Further details of the construction of the apparatus embodying the preferred forms of the invention are fully brought out in the following description, when read in conjunction with the accompanying drawings in which Figure 1 is a front elevation of the invention in one of its embodiments; Fig. 2 is a plan view of another embodiment thereof; Fig. 3 is a front elevation of a third form; Fig. 4 is an enlarged detail view of one of the preferred embodiments of the balance indicating mechanism; Fig. 5 is a vertical transverse view of the same on the line 5—5 thereof; Fig. 6 is an enlarged detail sectional view of one of the weight operating mechanisms of said first mechanism; and Fig. 7 is a side elevation of the vane wheel shown in Figs. 4, 5 and 6.

Referring to Fig. 1 of the drawings, the invention there shown comprises a balancing machine in which the body being tested is positioned above the bed of the vibratory frame, while the driving mechanism and the body, provided with adjustable weights and capable of having its principal axis or inertia shifted while in motion, are positioned below said bed.

A rigid base, comprising legs 5 and a horizontally extending frame 6, is securely fastened to a firm foundation, while supported upon said frame by one or more hinges, or other pivotal mountings, 7 and interchangeable spring or springs 8 of predetermined periods of natural vibration (described in the copending application, Serial No. 36,573) is a rigid base 9, extending upwardly from, and firmly secured to, which is a stationary head stock 10 and adjustable tail stock 11. The line extending through the hinges, or the line about which the system is adapted to vibrate, it should be noted, is preferably perpendicular to the plane of the axes of revolution of the balancing body and the body being tested.

The said head and tail stocks support the respective live and dead spindles or centers 14 and 15, the former of which is driven by an adjustable speed motor 16, or its equivalent, through the medium of a sprocket chain 17 or the like, it being essential that there is no possibility of the slipping of the means of power transmission, which would permit a lag of the live spindle behind the said driving mechanism. The revoluble body 18 to be tested is lifted into place and supported by the centers above described, or the same may be augmented by one or more intermediate bearings in the case of objects of considerable weight and length.

From the under side of the bed 9 is suspended by means of brackets 20 the body 21 (hereinafter described in detail) capable of adjustable dynamic balance, said body being also driven by the motor 16 through a suitable non-slip medium 22. The result of this arrangement is that, as the motor is run at a given speed, the revolving bodies above and below the machine bed are run in absolute and unfailing synchronism, and as the system supported by the base tends to vibrate, it moves as a unit and with no flexibility between the respective elements of which it is composed.

Thus, with the construction above described it is possible to test any body capable of being supported and rotated upon the centers 14 and 15, or equivalent supports, without regard to the size, weight, or shape of the adjustable standard body 21. The operation of the device when set up is exactly similar to that described in the first of the above-mentioned applications, and with a given lack of balance of the body 18 and a consequent vibration of the bed 9, the proper adjustment of the body 21 restores the balance of the system, thereby reducing the degree of said vibration until it disappears altogether.

In the form of the device shown in Fig. 2, a bed 25 is provided similar to the bed 9 of Fig. 1, but with a second bed 26 rigidly attached thereto, or integral therewith, the latter being adapted to support in upright position the variable speed motor 27, brackets 28, and standard testing body 29, while upon said first bed is in turn mounted the head and tail stocks 30 and 31, revolubly supporting the body 32 being tested; said first and second bodies being driven by said motor in synchronism with each other. The bed 25 is movably supported with one point fixed by the pivotal pin 33 upon any suitable base or other foundation, and yieldingly positioned by resilient members 34 of known periods of natural vibration in turn positioned by any suitable brackets or stop 35, the operation of the device being exactly similar to that above described. However, this form may be turned up on one end, thus making it possible to balance with it bodies designed to rotate about vertical axes.

Illustrated in Fig. 3 is an arrangement of the elementary parts of the invention somewhat similar to that shown in Fig. 1, but with the standard, capable of being adjusted to possess perfect balance, body 38 supported above the vibratorily mounted bed 39, while the body 40 being tested is suspended below the same, both being driven synchronously by the motor 41. This form of the invention is particularly advantageous in the testing of car wheels and axles, and in fact any rotatable bodies which are of considerable weight and which it is possible to roll substantially into position upon rails 42, or the like, from which they are raised into operative position in the machine.

Referring to Figs. 4 to 7, the details of one embodiment of the adjustable balancing mechanism are shown. Essentially the same comprises end plates 45, connected by rods 46, fixed with respect thereto to form a "squirrel cage" revoluble upon the axis 46', said rods being provided respectively with dove-tail grooves 47, in which are slidably mounted longitudinally movable weights 48, provided in turn with rack teeth 49. Surrounding and secured to each of the said rods are spaced collars 50, having integral radially extending flanges 51, the peripheral and adjacent surfaces of which form bearings for wheels 54, provided on their outer faces with radially extending vanes 55 and upon the inner faces of their axial bores with spiral teeth 56, adapted to mesh with the teeth of said rack and operative thereby to oscillate the same in the grooves 47 of the rods 46.

To actuate the said weights or rods while the device is in motion, jets of fluid may be directed against the vane wheels as they revolve past suitably positioned nozzles from which said fluid is forced. However, in Fig. 5 is shown a manner of accomplishing the same result frictionally by manually holding in the path of said wheels as they whirl around, a yielding member 58 of such material as rubber or leather. To reverse the displacement of the weights of a given pair, the motion of the bodies is reversed, but in other respects the operation is the same.

Thus, a position of the weights is finally determined at which the revolving bodies of the system, whether on coincident axes or axes not coincident but lying in the same plane, rotate synchronously at the desired speed with no vibration perceptible to a device which characteristically magnifies to a great extent the smallest tremble. Secondly, from the displacement of the respective weights the ratio of the angular and radial positions, from which material must be removed from the body being tested, and the quantity of said material, is readily determined, after which the balancing of the body is the simple result of drilling into the selected portions of the surface thereof, a sufficient depth to remove the necessary weight of material, or else by adding weights calculated to produce the same effect, always subject to the condition that the centrifugal couple created thereby is numerically equal to, and otherwise in agreement with, that indicated by the adjustment of the said weights.

Having thus described my invention, what I claim and desire to protect by Letters Patent of the United States is:—

1. A balancing machine, comprising a rotatable support for a body to be tested, a rotatable body revoluble upon an axis out of coincidence with the axis of rotation of said support, and provided with adjustable parts to alter the degree of its dynamic balance, and means operative to drive said support and said body in synchronism.

2. A balancing machine, comprising a rotatable support for a body to be tested, a rotatable body provided with adjustable parts to alter the degree of its dynamic balance while the same is rotating, said body being rotatable about an axis out of coincidence with the axis of rotation of said support, and means operative to revolve said support and said body in absolute synchronism.

3. A balancing machine, comprising a rotatable support for a body to be tested, a rotatable body provided with adjustable parts to alter the degree of its dynamic balance while the same is rotating, said body being rotatable about an axis spaced from but parallel with the axis of rotation of said support, and driving means operative to move said support and said body in synchronism.

4. The combination of two bodies rotatable about fixed axes passing through their respective centers of mass but out of coincidence with each other, means connecting said bodies to move them synochronously, and means carried by one of said bodies and operative to be adjusted to neutralize the effect of the principal axis of inertia of the other of said bodies being out of coincidence with its axis of rotation.

5. The combination of a body rotatable about an axis passing through its center of mass, and provided with adjustable weights operative to create a centrifugal couple, a second body associated to rotate synchronously with the first and rotatable about an axis spaced from said first axis and having a centrifugal couple neutralized by said first couple, and means to rotate said bodies synchronously.

6. The combination of a body rotatable about an axis passing through its center of mass, adjustable weights carried by said body operative to create a centrifugal couple, and a second body having a centrifugal couple to be neutralized by said first couple, means to rotate said bodies synchronously, said bodies having their respective centers of mass located upon axes of rotation separated from each other.

7. The combination of a body rotatable about an axis passing through its center of mass, adjustable weights carried by said body and operative to create a centrifugal couple, a second body having a centrifugal couple to be neutralized by said first couple, means to rotate said bodies synchronously, said bodies having their respective centers of mass located upon axes of rotation separated from but parallel with each other, and means for indicating the geometrical and mechanical elements of said neutralizing couple.

8. In a dynamic balancing machine, a system comprising adjustable means adapted to revolve in synchronism with a body to be tested, and to alter the degree of dynamic balance of said system, means to revolve said system and said body synchronously, said system and said body when in position being rotatable about separate axes passing through their respective centers of mass, said means being movable in said system parallel with the axis of rotation thereof, and means operative to shift said first means while said machine is in operation.

9. In a dynamic balancing machine, a system comprising adjustable means adapted to revolve in synchronism with a body to be tested, and to alter the degree of balance of said system, means to revolve said system and said body synchronously, said system and said body when in position being rotatable about separate axes lying in the same plane and passing through their respective centers of mass.

10. In a dynamic balancing machine, a system comprising means adapted to revolve in synchronism with a body to be tested, means to revolve said system and said body synchronously, said system and said body when in position being rotatable about separate axes lying in the same plane and passing through their respective centers of mass, pairs of weights movable in opposite directions in said system with respect to the center of mass of said system and parallel with the axis of rotation thereof, said weights being operative to alter the degree of balance of said system, and means operative to shift said weights while said machine is in operation.

11. In a dynamic balancing machine, a system comprising means adapted to revolve in synchronism with a body to be tested, means to revolve said system and said body synchronously, said system and said body when in position being rotatable about separate axes lying in the same plane and passing through their respective centers of mass, pairs of weights movable in opposite directions in said system with respect to the center of mass of said system and parallel with the axis of rotation thereof, said weights being operative to alter the degree of balance of said system, and electrically operated means operative to shift said weights while said machine is in operation.

12. In a dynamic balancing machine, a system comprising means adapted to revolve in synchronism with a body to be tested, means to revolve said system and said body synchronously, said system and said body when in position being rotatable about separate axes lying in the same plane and passing through their respective centers of mass, pairs of weights movable in opposite directions of said system with respect to the center of mass of said system and parallel with the axis of rotation thereof, said weights being operative to alter the degree of balance of said system, and fluid operated means operative to shift said weights while said machine is in operation.

13. A system comprising a plurality of bodies rotatable synchronously about spaced parallel axes fixed within said bodies, means to rotate said bodies synchronously, one of said bodies comprising adjustable weights, means coöperating with said weights and adapted to adjust the same, to alter the position of the principal axis of inertia of said body relative to the direction of the axes of rotation of the bodies comprising said system and thereby to alter the degree of dynamic balance of said system.

14. The combination of a body rotatable about an axis passing through its center of mass, adjustable weights carried by said body and creating a centrifugal couple, operative to alter the degree of dynamic balance of said body, a second body having a centrifugal couple neutralized by said first couple, said bodies being connected to revolve in synchronism and having their respective centers of mass located upon axes of rotation separated from each other, means to revolve said bodies synchronously, and a support for said bodies comprising yielding means having a predetermined natural period of vibration under a given load.

15. The combination of a body rotatable about an axis passing through its center of mass, adjustable weights carried by said body and creating a centrifugal couple operative to alter the degree of dynamic balance of said body, a second body having a centrifugal couple neutralized by said first couple, said bodies being connected to revolve in synchronism and having their respective centers of mass located upon axes of rotation separate from but parallel with each other, means for indicating the geometrical and mechanical elements of said neutralizing couple, and a support for said bodies comprising resilient members having a predetermined natural period of vibration under a given load.

16. In a dynamic balancing machine, a system comprising means adapted to revolve in synchronism with a body to be tested, means to revolve said system and said body synchronously, said system and said body when in position being rotatable about separate axes lying in the same plane and passing through their respective centers of mass, weights movable in said system parallel with the axis of rotation thereof, means operative to shift said weights while said machine is in operation to alter the degree of dynamic balance of said system, and a support for said bodies comprising resilient means having a predetermined natural period of vibration under a given load.

17. In a dynamic balancing machine, a system comprising means adapted to be associated with a body to be tested, means whereby said system and said body are adapted for synchronous rotation about parallel axes passing through their respective centers of mass, said system comprising weights movable therein parallel with the axis of rotation thereof, and means operative to shift said weights while said system is in rotation.

18. In a dynamic balancing machine, a system comprising means adapted to be associated with a body to be tested, means whereby said system and said body are adapted for synchronous rotation about axes passing through their respective centers of mass and lying in the same plane, said system comprising weights movable therein parallel with the axis of rotation thereof, and means operative to shift said weights while said system is in rotation.

19. In a dynamic balancing machine, a system comprising means adapted to be associated with a body to be tested, means whereby said system and said body are adapted for synchronous rotation about parallel axes passing through their respective centers of mass, said system comprising pairs of weights movable therein parallel with the axis of rotation thereof and in opposite directions, and means operative to shift said weights while said system is in rotation.

20. In a dynamic balancing machine, a system comprising means adapted to be associated with a body to be tested, means whereby said system and said body are adapted for synchronous rotation about axes passing through their respective centers of mass and lying in the same plane, said system comprising pairs of weights movable therein parallel with the axis of rotation thereof and in opposite directions, and means operative to shift said weights while said system is in rotation.

21. A balancing machine, comprising an oscillator limited to one degree of freedom, a rotatable support mounted thereupon, said oscillator being operative to indicate the state of balance of a body carried by said support, means movable in synchronism with said support to impose upon said oscillator a forced vibration of desired frequency and amplitude, and means to drive said support and said first means synchronously.

22. A balancing machine, comprising an oscillator limited to one degree of freedom, a rotatable support for a body to be tested mounted upon said oscillator, and means adapted to rotate in synchronism with said support and operative to impose upon said oscillator a forced vibration.

23. A balancing machine, comprising an oscillator limited to one degree of freedom, a rotatable support for a body to be tested mounted upon said oscillator, and means adapted to rotate in synchronism with said support and operative to impose upon said oscillator a forced vibration of any desired amplitude and frequency.

24. A balancing machine, comprising an oscillator limited to one degree of freedom, a rotatable support carried thereby and adapted to receive a body to be tested, means to impose upon said oscillator a forced vibration of any desired frequency and amplitude, and means for estimating the impressed generalized force in function of one linear coefficient only.

25. A balancing machine, comprising an oscillator limited to one degree of freedom, a rotatable support carried thereby and adapted to receive a body to be tested, means to impose upon said oscillator a forced vibration of any desired frequency an amplitude, and means for estimating the impressed generalized force in function of one linear coefficient only while the said system is in motion.

26. A balancing machine, comprising an oscillatory mounting, a support mounted thereon and adapted to receive and rotatably support a body to be tested, means to impose upon said mounting a forced vibration of any desired amplitude, and means to move a body upon said support and said first means in harmony.

27. A balancing machine, comprising an oscillatory mounting, means for rotatably supporting a body to be tested and carried by said mounting, means also carried by and adapted to impose a forced vibration upon said mounting, and connections whereby said last means is moved in harmony with a body upon said first means, the whole being operative to test the dynamic balance of a body upon said first means.

28. A balancing machine, comprising an oscillatory mounting, means for rotatably supporting a body to be tested and carried by said mounting, means also carried by said mounting and adjustable to vary its dynamic balance, and connections whereby said last means is moved in harmony with a body upon said first means, the whole being operative to test the dynamic balance of a body upon said first means.

29. A balancing machine, comprising an oscillatory mounting limited to one degree of freedom, a support for a body to be tested while rotating carried by said oscillator, said oscillator being operative to indicate the state of balance of a body carried by said support, means to impose upon said oscillator a forced vibration of any desired amplitude, and means to rotate a body upon said support and to operate said first means in harmony.

In witness whereof I have hereunto set my hand this 28th day of October, 1915.

NICHOLAS W. AKIMOFF.

Witnesses:
ALBERT C. RICHTER,
J. STUART FREEMAN.